United States Patent
Chen

(10) Patent No.: US 8,433,534 B2
(45) Date of Patent: Apr. 30, 2013

(54) ELECTRONIC DEVICE AND METHOD FOR TESTING MULTIPLE FEATURES OF THE ELECTRONIC DEVICE

(75) Inventor: Chi-Hsien Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 794 days.

(21) Appl. No.: 12/479,827

(22) Filed: Jun. 7, 2009

(65) Prior Publication Data
US 2009/0326853 A1 Dec. 31, 2009

(30) Foreign Application Priority Data
Jun. 27, 2008 (CN) .......................... 2008 1 0302404

(51) Int. Cl.
*G01D 3/00* (2006.01)

(52) U.S. Cl.
USPC ........................... 702/108; 702/117; 702/118

(58) Field of Classification Search .................. 702/108, 702/117–120
See application file for complete search history.

(56) References Cited

U.S. PATENT DOCUMENTS

| | | | | |
|---|---|---|---|---|
| 5,164,923 A * | 11/1992 | Avis | .................................. | 368/4 |
| 6,708,135 B2 * | 3/2004 | Southworth et al. | .......... | 702/176 |
| 7,512,092 B2 * | 3/2009 | Laurila | .......................... | 370/328 |
| 2005/0136988 A1 * | 6/2005 | Villamil et al. | ................ | 455/567 |
| 2005/0192002 A1 * | 9/2005 | Varanda | ........................ | 455/423 |
| 2009/0098868 A1 * | 4/2009 | Cheng | ............................ | 455/425 |

FOREIGN PATENT DOCUMENTS

| | | |
|---|---|---|
| CN | 1553598 | 12/2004 |
| CN | 1849054 | 10/2009 |

OTHER PUBLICATIONS

Stricker, Walt, "Saving Time and Money on Mobile Phone Production Testing", Keithley Instruments, Inc., No. 2536, www.keithley.com, 2 pages, Jul. 2004.*

* cited by examiner

*Primary Examiner* — Jonathan C Teixeira Moffat
*Assistant Examiner* — Mischita Henson
(74) *Attorney, Agent, or Firm* — Altis Law Group, Inc.

(57) ABSTRACT

A method for testing multiple features of an electronic device sets a global timer and a series of feature test timers. The feature test timers are arranged in a sequence. The global timer is firstly activated. The feature test timers are then activated one by one according to the sequence and one or more features of the electronic device corresponding to each of the feature test timers are tested until the global timer times out.

12 Claims, 3 Drawing Sheets

ELECTRONIC DEVICE AND METHOD FOR TESTING MULTIPLE FEATURES OF THE ELECTRONIC DEVICE

BACKGROUND

1. Technical Field

Embodiments of the present disclosure relate to testing an electronic device, and particularly to an electronic device and method for testing multiple features of the electronic device.

2. Description of Related Art

Mean time between failures (MTBF) is usually used to estimate reliability of a product, such as a mobile phone. At present, more and more features, such as radio frequency (RF) transmitter, RF receiver, vibrator, backlight, speaker, camera, Bluetooth, and radio, are provided in a mobile phone. As a result, MTBF tests of the mobile phone become complicated since a number of features need testing. A test device (e.g., a computer) may be utilized to test the multiple features. Use of test device makes it inconvenient to implement the MTBF test and causes test costs to increase.

DETAILED DESCRIPTION

All of the processes described below may be embodied in, and fully automated via, functional code modules executed by one or more general purpose processors of an electronic device. The code modules may be stored in any type of storage medium. Some or all of the methods may alternatively be embodied in specialized hardware.

Figure 1:
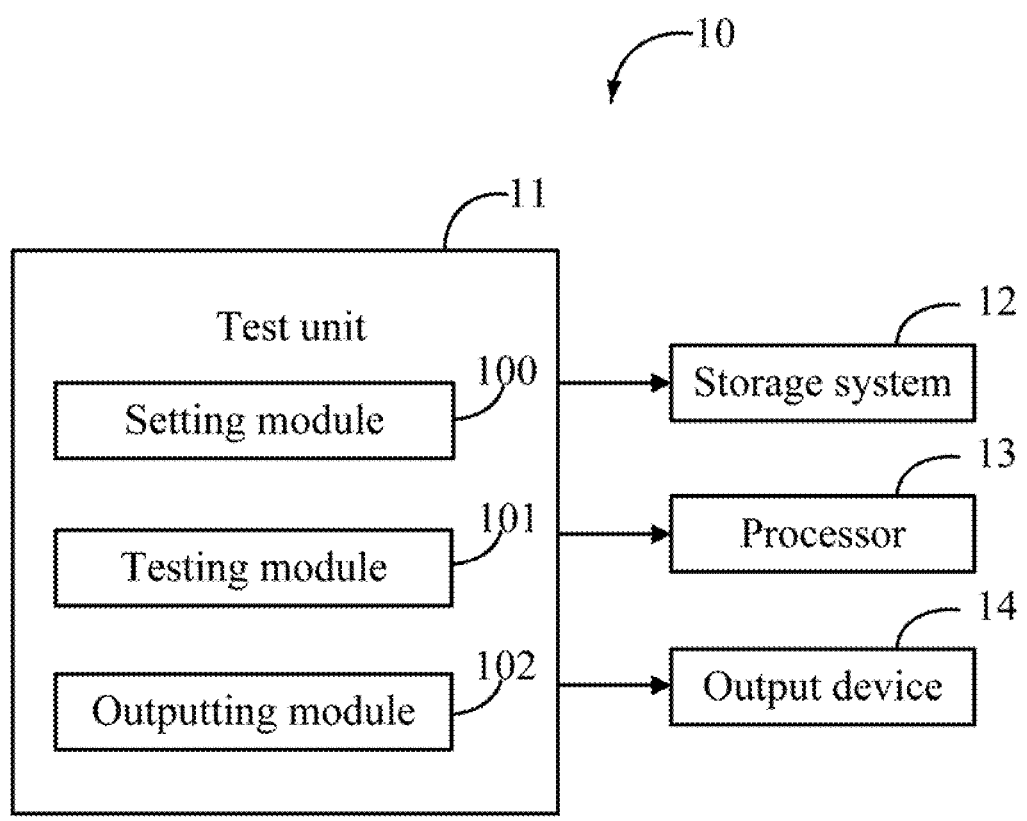
FIG. 1 is a block diagram of one embodiment of an electronic device capable of testing multiple features of the electronic device without additional test devices.

FIG. 1 is a block diagram of one embodiment of an electronic device 10 capable of testing multiple features of the electronic device 10 without additional test devices. The electronic device 10 may be a mobile phone, a personal digital assistant (PDA), or any other electronic data processing systems equipped with various features. In one example, the electronic device 10 is a mobile phone. The mobile phone provides features of a radio frequency (RF) transmitter, an RF receiver, a backlight, a speaker, and a vibrator.

The electronic device 10 may include a test unit 11 that comprises a setting module 100, a testing module 101, and an outputting module 102. The electronic device 10 may include one or more processors, such as a processor 13 to execute the test unit 11. The electronic device 10 may further comprise a storage system 12 that stores the test unit 11. The storage system 12 may include an internal memory and an external memory. The external memory may include a smart media card (SMC), a secure digital card (SDC), a compact flash card (CFC), a multi media card (MMC), a memory system stick (MS), an extreme digital card (XDC), and a trans flash card (TFC).

The setting module 100 is operable to set a global timer and a series of feature test timers. Each of the feature test timers may correspond to one or more features of the electronic device 10. The setting module 100 assigns a total test time for the global timer. The setting module 100 further assigns a feature test period for each of the feature test timers. In one example, the setting module 100 sets a transmitter test timer, a receiver test timer, a backlight test timer, a speaker test timer, and a vibrator test timer. The transmitter test timer is for the RF transmitter of the electronic device 10. The receiver test timer is for the RF receiver of the electronic device 10. The backlight test timer is for the backlight of the electronic device 10. The speaker test timer is for the speaker of the electronic device 10. The vibrator test timer is for the vibrator of the electronic device 10. A transmitter test period, a receiver test period, a backlight test period, a speaker test period, and a vibrator test period are assigned for the transmitter test timer, the receiver test timer, the backlight test timer, the speaker test timer, and the vibrator test timer, respectively.

The setting module 100 may be further operable to arrange the feature test timers in a sequence. For example, the transmitter test timer may be the first timer in the sequence. The receiver test timer may be the second timer in the sequence. The backlight test timer may be the third timer in the sequence. The speaker test timer may be the fourth timer in the sequence. The vibrator test timer may be the fifth timer in the sequence.

The testing module 101 is operable to test the multiple features of the electronic device 10 by utilizing the global timer and the feature test timers according to the sequence. The testing module 101 activates the global timer firstly, and then activates the feature test timers one by one according to the sequence until the global timer times out. After one of the feature test timers is activated, the testing module 101 tests the one or more features corresponding to the feature test timer and obtains a feature test result. For example, the testing module 101 calculates a failed test account for each feature. A failed test account for one feature denotes how many times the feature works abnormally.

In one example, the setting module 100 sets a first feature test timer, a second feature test timer, and a third feature test timer. Accordingly, the testing module 101 may perform steps of: (1) activating the first feature test timer and testing one or more features corresponding to the first feature test timer; (2) activating the second feature test timer when the first feature test timer times out and testing one or more features corresponding to the second feature test timer; (3) activating the third feature test timer when the second feature test timer times out and testing one or more features corresponding to the third feature test timer; (4) returning to step (1) when the third feature test timer times out; and (5) repeating step (1)-(4) until the global timer times out. In one embodiment, the testing module 101 may verify whether the one or more features work normally, and records a feature test result in testing the one or more features corresponding to each feature test timer.

The outputting module 102 is operable to obtain a total test result by integrating all the feature test results when the global timer times out, and output the total test result to an output device 14. For example, the outputting module 102 may sum up all the failed test accounts to obtain a total failed test account.

Figure 2:
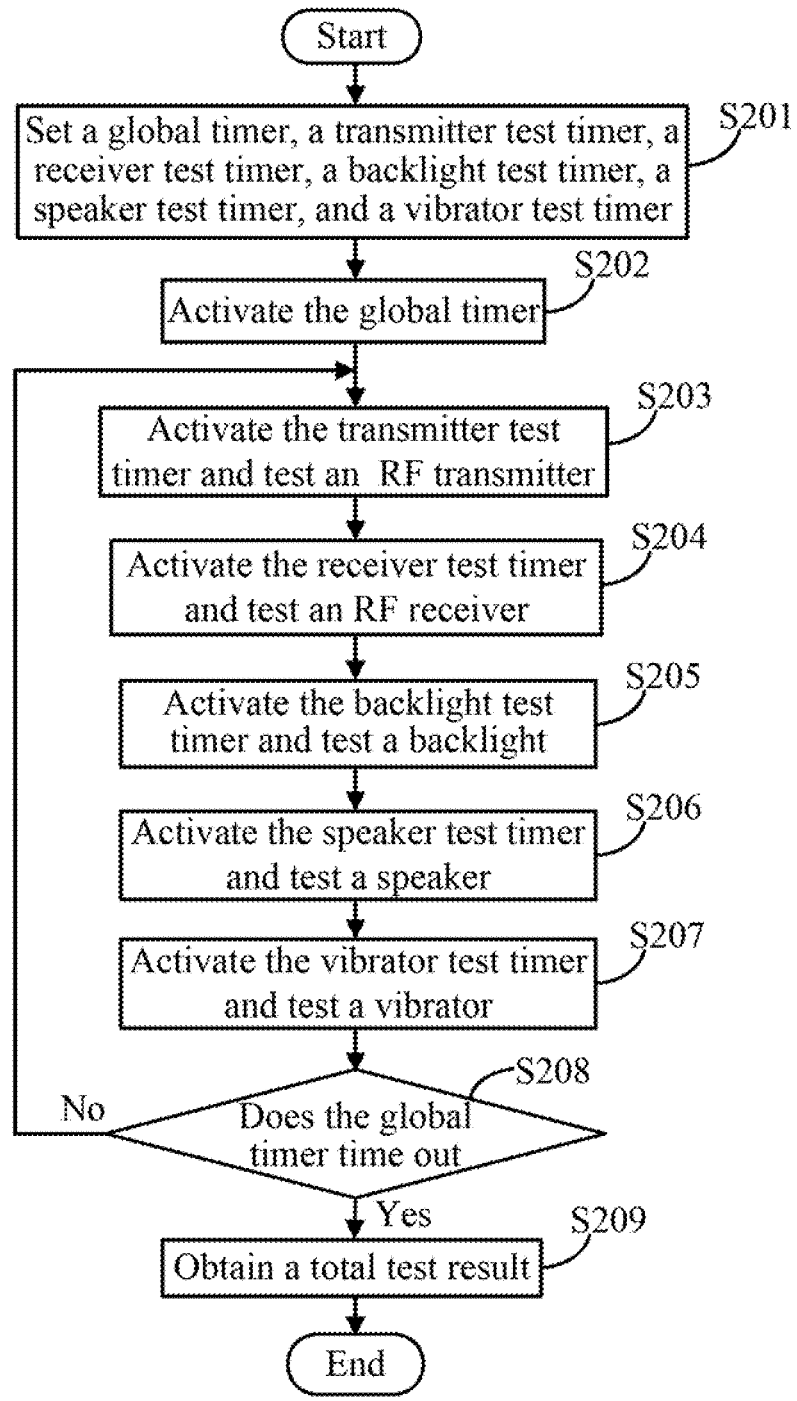
FIG. 2 is a flowchart of one embodiment of a method for testing multiple features of an electronic device without additional test devices.

FIG. 2 is a flowchart of one embodiment of a method for testing multiple features of the electronic device 10 by implementing the test unit 11 of FIG. 1. The multiple features of the electronic device 10 may be tested without additional test devices by implementing the method. In the exemplary embodiment, the electronic device 10 is a mobile phone that provides features of a radio frequency (RF) transmitter, an RF receiver, a backlight, a speaker, and a vibrator. The features are to be tested one by one. Depending on the embodiments, additional blocks may be added, others removed, and the ordering of the blocks may be changed.

In block 201, the setting module 100 sets a global timer, a transmitter test timer, a receiver test timer, a backlight test timer, a speaker test timer, and a vibrator test timer. As mentioned above, the transmitter test timer, the receiver test timer, the backlight test timer, the speaker test timer, and the vibrator test timer may be assigned for the appropriate hardware in the mobile phone. A total test time may be assigned for the global timer. In one example, the total test time may be a MTBF, such as 1000 hours. A transmitter test period, a receiver test period, a backlight test period, a speaker test period, and a vibrator test period may be assigned for the corresponding feature test timers. In one example, the transmitter test period, the receiver test period, the backlight test period, the speaker test period, and the vibrator test period may be same, such as 120 seconds, for example. In another example, the transmitter test period, the receiver test period, the backlight test period, the speaker test period, and the vibrator test period may be different. For example, the transmitter test period is 100 seconds. The receiver test period is 120 seconds. The backlight test period is 140 seconds. The speaker test period is 160 seconds. The vibrator test period is 180 seconds.

In block 201, the setting module 100 further arranges the transmitter test timer, the receiver test timer, the backlight test timer, the speaker test timer, and the vibrator test timer in a sequence. In one example, the transmitter test timer is the first timer. The receiver test timer is the second timer. The backlight test timer is the third timer. The speaker test timer is the fourth timer. The vibrator test timer is the fifth timer. The following descriptions of blocks 202-209 are based on the sequence.

In block 202, the testing module 101 activates the global timer.

In block 203, the testing module 101 activates the transmitter test timer and tests the RF transmitter. The RF transmitter may be enabled, the RF receiver, the backlight, the speaker, and the vibrator may be disabled while the RF transmitter is tested. The testing module 101 may verify whether the RF transmitter works normally, and record a transmitter test result. For example, a failed test count of the transmitter test may be calculated in the testing process of the RF transmitter.

In block 204, the testing module 101 activates the receiver test timer and tests the RF receiver when the transmitter test timer times out. The RF receiver may be enabled, the RF transmitter, backlight, speaker, and vibrator may be disabled while the RF receiver is tested. The testing module 101 may verify whether the RF receiver works normally, and record a receiver test result. For example, a failed test count of the receiver test is calculated in the testing process of the RF receiver.

In block 205, the testing module 101 activates the backlight test timer and tests the backlight test feature when the receiver test timer times out. The backlight may be enabled, the RF transmitter, the RF receiver, the speaker, and the vibrator may be disabled while the backlight is tested. The testing module 101 may verify whether the backlight works normally and record a backlight test result. For example, a failed test count of the backlight test is calculated in the testing process of the backlight.

In block 206, the testing module 101 activates the speaker test timer and tests the speaker. The speaker may be enabled, the RF transmitter, the RF receiver, the backlight, and the vibrator may be disabled while the speaker is tested. The testing module 101 may verify whether the speaker works normally, and record a speaker test result. For example, a failed test count of the speaker test is calculated in the testing process of the speaker.

In block 207, the testing module 101 activates the vibrator test timer and tests the vibrator when the speaker test timer times out. The vibrator may be enabled, the RF transmitter, the RF receiver, the backlight, and the backlight may be disabled while the vibrator is tested. The testing module 101 may verify whether the vibrator works normally, and record a vibrator test result. For example, a failed test count of the vibrator test is calculated in the testing process of the vibrator.

In block 208, the testing module 101 determines whether the global timer times out. If the global timer is not timeout, the procedure may return to S203 when the vibrator test timer times out.

Otherwise, if the global timer times out, in block 209, the outputting module 102 obtain a total test result by integrating the transmitter test result, the receiver test result, the backlight test result, the speaker test result, and the vibrator test result described in block 203-207 and outputs the total test result to the output device 14, such as a printer or a display screen. For example, the outputting module 103 sums up the failed test counts of the transmitter test, the receiver test, the backlight test, the speaker test, and the vibrator test, so as to obtain a total failed test count of testing the multiple features.

Figure 3:
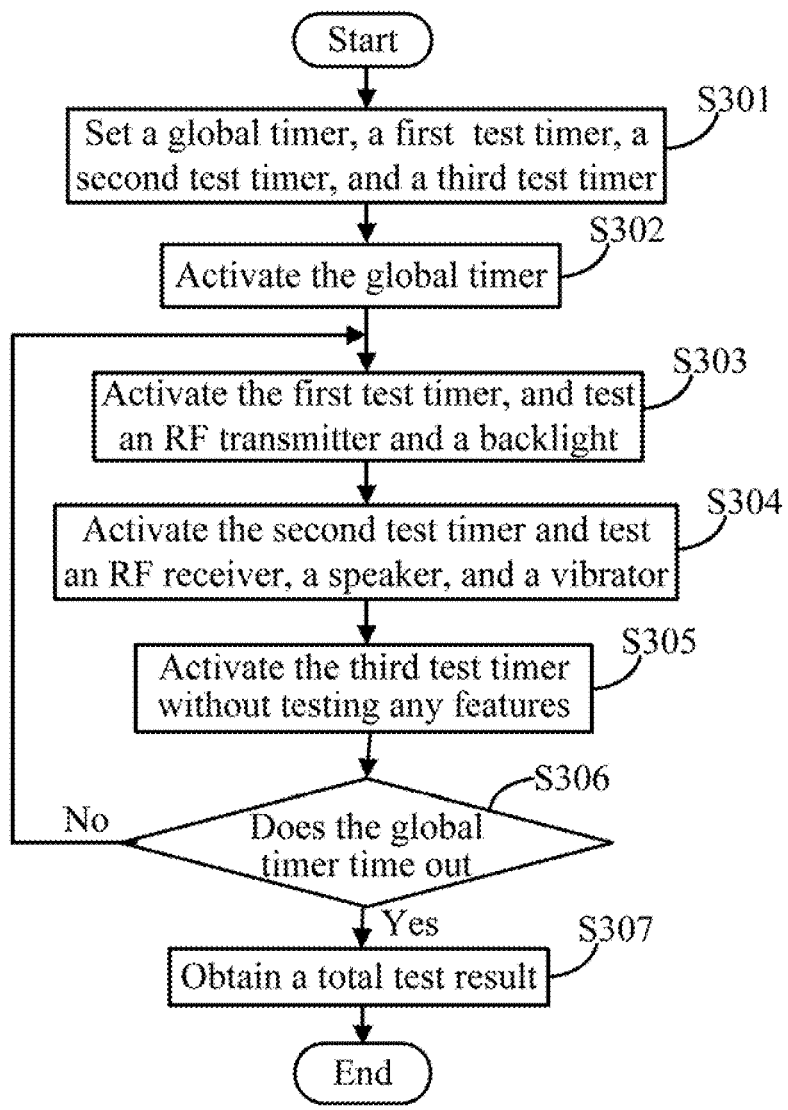
FIG. 3 is a flowchart of another embodiment of a method for testing multiple features of an electronic device without additional test devices.

FIG. 3 is a flowchart of another embodiment of a method for testing multiple features of the electronic device 10 by implementing the test unit 11 of FIG. 1. The multiple features of the electronic device 10 may be tested without additional test devices by implementing the method. In the exemplary embodiment, the electronic device 10 is a mobile phone that provides features of an RF transmitter, an RF receiver, a backlight, a speaker, and a vibrator. More than one feature is tested at the same time for greater efficiency. Depending on the embodiments, additional blocks may be added, others removed, and the ordering of the blocks may be changed.

In block 301, the setting module 100 sets a global timer, a first test timer, a second test timer, and a third test timer. The first test timer corresponds to the RF transmitter and the backlight. The second test timer corresponds to the RF receiver, the speaker, and the vibrator. A total test time, such as 1000 hours, is assigned for the global timer. A first test period, a second test period, and a third test period are assigned for the first test timer, the second test timer, and the third test timer, respectively. The third test timer does not correspond to any features. In one embodiment, each of the test periods is 120 seconds.

In block 302, the testing module 101 activates the global timer.

In block 303, the testing module 101 activates the first test timer and tests the RF transmitter and the backlight. In the embodiment, the RF transmitter and the backlight may be enabled, the RF receiver, the speaker, and the vibrator may be disabled while the RF transmitter and the backlight are tested. The testing module 101 may verify whether the RF transmitter and the backlight work normally, and record a first test result about the transmitter and backlight test.

In block 304, the testing module 101 activates the second test timer and tests the RF receiver, the speaker, and the vibrator when the first test timer times out. In the embodiment, the RF receiver, the speaker, and the vibrator may be enabled, and the RF transmitter and the backlight may be disabled while the RF receiver, the speaker, and the vibrator are tested. The testing module 101 may verify whether the RF receiver, the speaker, and the vibrator work normally, and record a second test result about the receiver, speaker and vibrator test.

In block 305, the testing module 101 stops testing the RF receiver, the speaker, and the vibrator when the second test timer times out and activates the third test timer.

In block 306, the testing module 102 determines whether the global timer times out. If the global timer is not timeout, the procedure may return to S303 when the third test timer times out.

Otherwise, if the global timer times out, in block 307, the outputting module 102 obtain a total test result by integrating the first and the second test results described in block 303-304, and outputs the total test result to the output device 14, such as a printer or a display screen.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   at least one processor operable to execute program instructions; and
   a storage system operable to store the program instructions executable by the at least one processor, for performing steps of:
   setting a global timer and a series of feature test timers, assigning a total test time for the global timer, and arranging the feature test timers in a sequence, wherein the total test time is a mean time between failure (MTBF) and each of the feature test timers corresponds to one or more features of the electronic device;
   activating the global timer;
   activating the feature test timers one by one according to the sequence, testing the one or more features of the electronic device corresponding to each of the feature test timers, and obtaining a feature test result in each testing process, until the global timer times out; and
   obtaining a total test result by integrating all the feature test results, and outputting the total test result to an output device of the electronic device.

2. The electronic device of claim 1, wherein the electronic device is a mobile phone or a personal digital assistant.

3. The electronic device of claim 2, wherein the mobile phone provides features of a radio frequency (RF) transmitter, an RF receiver, a backlight, a speaker, and a vibrator.

4. The electronic device of claim 1, wherein the output device is a printer or a display screen.

5. A method being executed by a processor of an electronic device for testing multiple features of an electronic device, the method comprising:
   setting a global timer and a series of feature test timers, assigning a total test time for the global timer, and arranging the feature test timers in a sequence by the electronic device, wherein the total test time is a mean time between failure (MTBF) and each of the feature test timers corresponds to one or more features of the electronic device;
   activating the global timer by the electronic device;
   activating the feature test timers one by one according to the sequence, testing the one or more features of the electronic device corresponding to each of the feature test timers, and obtaining a feature test result in each testing process, until the global timer times out by the electronic device; and
   obtaining a total test result by integrating all the feature test results, and outputting the total test result to an output device of the electronic device by the electronic device.

6. The method of claim 5, wherein the electronic device is a mobile phone or a personal digital assistant.

7. The method of claim 6, wherein the mobile phone provides features of a radio frequency (RF) transmitter, an RF receiver, a backlight, a speaker, and a vibrator.

8. The method of claim 5, wherein the output device is a printer or a display screen.

9. A non-transitory storage medium having stored thereon instructions that, when executed by an electronic device, cause the electronic device to execute a method for testing multiple features of the electronic device, the method comprising:
   setting a global timer and a series of feature test timers, assigning a total test time for the global timer, and arranging the feature test timers in a sequence, wherein the total test time is a mean time between failure (MTBF) and each of the feature test timers corresponds to one or more features of the electronic device;
   activating the global timer;
   activating the feature test timers one by one according to the sequence, testing the one or more features of the electronic device corresponding to each of the feature test timers, and obtaining a feature test result in each testing process, until the global timer times out; and
   obtaining a total test result by integrating all the feature test results, and outputting the total test result to an output device of the electronic device.

10. The non-transitory storage medium of claim 9, wherein the electronic device is a mobile phone or a personal digital assistant.

11. The non-transitory storage medium of claim 10, wherein the mobile phone provides features of a radio frequency (RF) transmitter, an RF receiver, a backlight, a speaker, and a vibrator.

12. The non-transitory storage medium of claim 9, wherein the output device is a printer or a display screen.

* * * * *